No. 837,300. PATENTED DEC. 4, 1906.
H. H. GROO.
STACKING APPARATUS.
APPLICATION FILED JAN. 26, 1906.
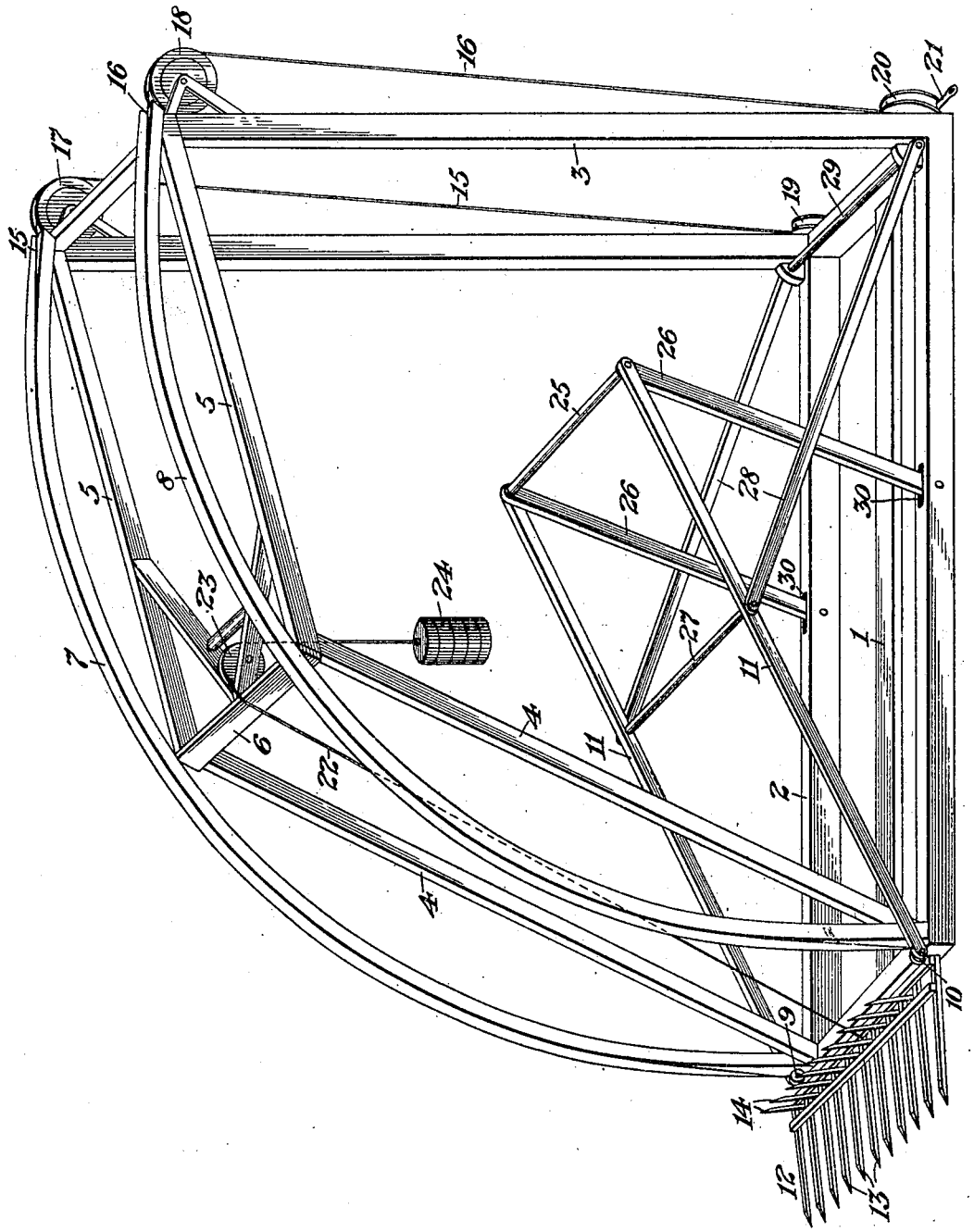

UNITED STATES PATENT OFFICE.

HOWARD HUNTER GROO, OF BIGPINEY, WYOMING.

STACKING APPARATUS.

No. 837,300.          Specification of Letters Patent.          Patented Dec. 4, 1906.

Application filed January 26, 1906. Serial No. 298,083.

*To all whom it may concern:*

Be it known that I, HOWARD HUNTER GROO, a citizen of the United States, and a resident of Bigpiney, county of Uinta, State of Wyoming, have invented certain new and useful Improvements in Stacking Apparatus, of which the following is a specification.

My invention relates to apparatus for stacking hay, grain, or other farm products; and it consists of improved devices whereby the operation of stacking is made easy and simple and an apparatus is provided which is comparatively inexpensive.

My invention will be understood by reference to the accompanying drawing, which is a perspective of a machine adapted to the purposes of my invention.

In the drawing, 1 is a frame having a horizontal portion 2 and an upright portion 3. The said frame is also generally provided with inclined supports 4 4 and top pieces 5 5, the same being suitably strengthened by means of a brace 6. Outside and above that part of the frame represented by the e e-ments 4 and 5 are curved guides 7 and 8, on which rollers 9 and 10, mounted on a movable frame 11, are adapted to run. These guides are preferably grooved on their outer periphery to receive the described rollers.

The movable frame 11 carries a fork-head 12, the teeth 13 of which are illustrated in a horizontal position ready to receive a load of hay or other material. The same fork-head carries vertical teeth 14, which serve to hold the load from dropping off during the movement of the fork in the process of lifting the load. The cords 15 and 16 pass under pulleys 19 and 20 at bottom of frame, thence up to and through pulleys 17 and 18, thence down inside of curved guides to rear end of fork-head, and are attached to fork-head inside of rollers 9 and 10. A horse or horses may be attached to double cord at 21. The fork-head 12 also has a cord 22 attached to its center at rear end, and this cord passes over a pulley 23, mounted near the middle of the upper part of the frame, beyond which pulley a counterweight 24 is applied. The object of this construction is to relieve the greater portion of the weight of the frame 11 and its connected parts, so that the power applied at 21 may practically all be utilized in lifting the hay and throwing it into place.

It will be seen that the frame 11 is pivoted at 25 upon movable or collapsible supports 26 26. Not far from the center of the frame 11 a rod 27 is passed through it, the ends of this rod forming pivots for the arms 28 28, which are pivoted at their opposite ends to a cross-rod 29 at the bottom of the main frame. The supports 26 26 are pivoted at their lower ends in the horizontal portion 2 of the frame 1, and their ends are located in slots 30 30 in said frame, whereby a certain amount of play is allowed to the supports.

By virtue of the fact that the pivot 25 of the frame 11 may take different positions by virtue of the adjustability permitted to it by the mode in which the supports 26 26 are mounted in the horizontal portion 2 of the frame 1 it is not necessary that the curve of the parts 7 and 8 should be circular; but it may approach more nearly the form of a parabola, this being brought about by the system of levers which cause the center of movement of the frame 11 to be shifted during the operation of the machine.

The rake 12 being loaded with hay or other product which it is desired to stack, suitable power is applied to the strap or other attaching device 21, whereupon the cords are pulled taut and the load is ultimately lifted under the influence of the applied power. The load travels over the curved guides or runways 7 and 8, being supported thereby for the most part, the power being simply utilized for moving the load and the friction being mainly taken up by the pulleys 9 and 10. When the limit of movement has been reached, the load is dumped behind the hay-stacker and the power is released, allowing the apparatus to return to the position illustrated in the drawings, whereupon another load may be put on the rake and the same operation repeated until the stack has been completed. The curved guides 7 and 8 are preferably provided with grooves in which the cords 15 and 16 lie.

I claim as my invention—

1. In a hay-stacking apparatus, a main frame, curved guides or runways supported by the said frame, a carrying-frame mounted on an adjustable pivot and having pulleys adapted to travel on said guides and also carrying a rake for receiving the load, in combination with means for moving the carrying-frame so as to transfer the load over the curved guides to the point of discharge.

2. In a hay-stacking apparatus, a main frame, curved guides supported by the said frame and provided with suitable grooves, a carrying-frame provided with rollers adapted to run in the said grooves and also having a rake for receiving the load, cords traversing the said grooves and attached to the said carrying-frame, pulleys over which the said cords travel, and secondary pulleys for the said cords, in combination with means for applying power to the cords beyond the said secondary pulleys, as and for the purpose set forth.

3. In a hay-stacking apparatus, a main frame, curved guides supported by the said frame and provided with suitable grooves, a carrying-frame provided with rollers adapted to run in the said grooves and also having a rake for receiving the load, cords traversing the said grooves and attached to the said carrying-frame, pulleys over which the said cords travel, and secondary pulleys for the said cords, in combination with means for applying power to the cords beyond the said secondary pulleys, the said carrying-frame being provided with an adjustable pivot, as and for the purpose set forth.

4. In a hay-stacking apparatus, a main frame, curved guides supported by the said frame and provided with suitable grooves, a carrying-frame provided with rollers adapted to run in the said grooves and also having a rake for receiving the load, cords traversing the said grooves and attached to the said carrying-frame, pulleys over which the said cords travel, and secondary pulleys for the said cords, in combination with means for applying power to the cords beyond the said secondary pulleys, the said carrying-frame being provided with an adjustable pivot and a counterweight for the said carrying-frame.

Signed this 4th day of January, A. D. 1906.

HOWARD HUNTER GROO.

Witnesses:
CHAS. ALEXANDER,
Mrs. C. W. BRANDON.